Aug. 13, 1940.　　　　C. G. HAWLEY　　　　2,211,565
METHOD AND APPARATUS FOR THE TREATMENT OF SEWAGE
Filed Sept. 16, 1936　　2 Sheets-Sheet 2

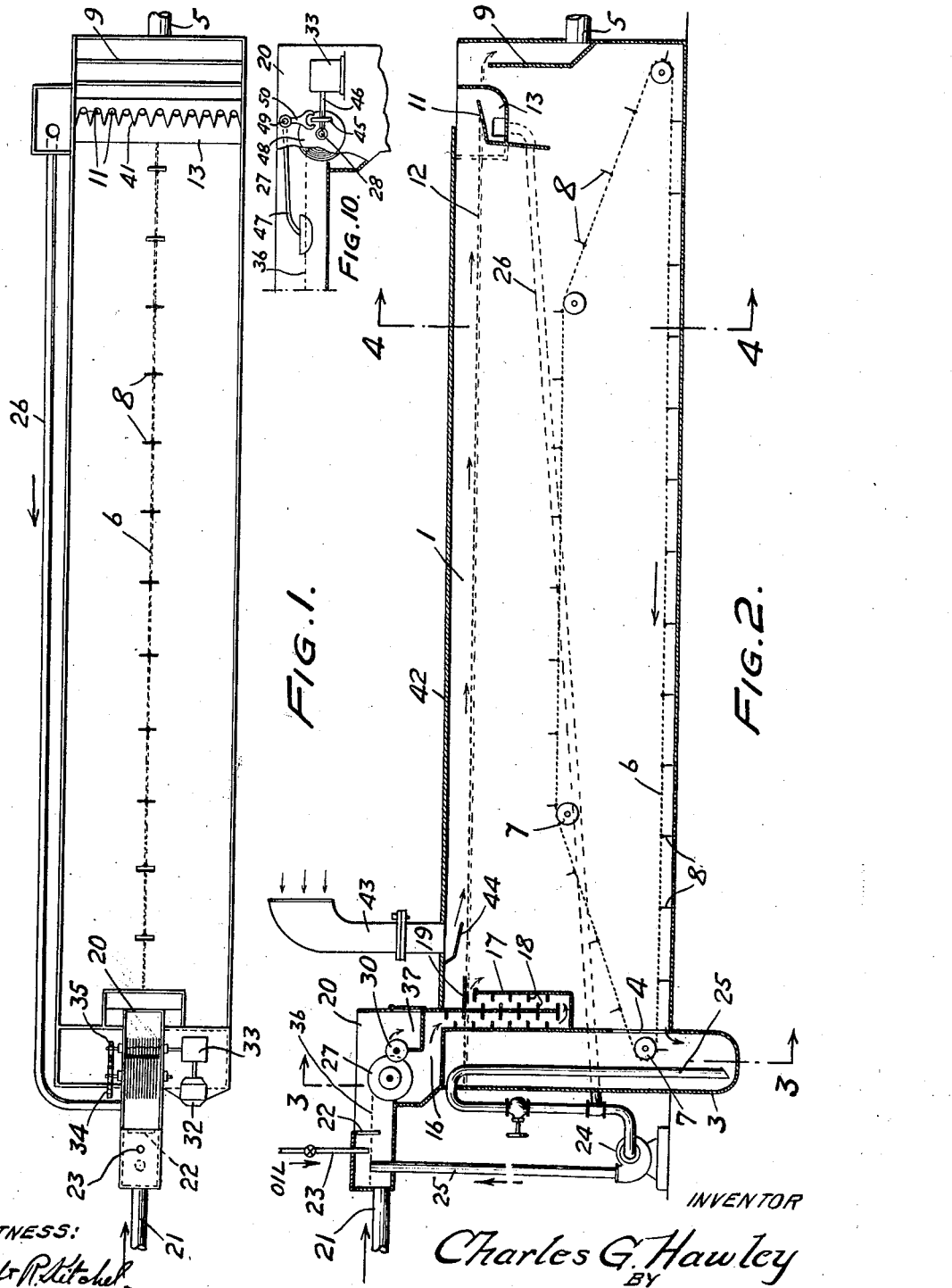

INVENTOR
Charles G. Hawley
BY
ATTORNEYS.

Patented Aug. 13, 1940

2,211,565

UNITED STATES PATENT OFFICE 2,211,565

METHOD AND APPARATUS FOR THE TREATMENT OF SEWAGE

Charles Gilbert Hawley, Chicago, Ill.; Hope Hawley Degenhardt and Virginia Taylor Hawley, executrices of Charles Gilbert Hawley, deceased, assignors to Virginia Taylor Hawley Application September 16, 1936, Serial No. 101,013

8 Claims. (Cl. 210—2)

This invention relates to an improvement in method and apparatus for the treatment of liquids burdened with solids, such as municipal and industrial intake and outfall liquids.

In accordance with this invention a method and apparatus for the treatment of sewage is provided by which solid matter is removed and continuously discharged in the form of a substantially dry mat or cake and an effluent of great clarity obtained. In accordance with this invention filtration of the more finely divided solid matter of the sewage is essentially accomplished by passage of the sewage through a mat or cake of the larger particles of solid matter carried by the sewage and to such end raw sewage or so-called sludge is first subjected to filtration, then to sedimentation and levitation and the sedimented and levitated matter together with the quantity of water necessary for their discharge finally subjected to filtration with a fresh quantity of raw sewage or sludge. The more finely divided solids comprising the sedimented and levitated matter are thus finally removed from the sewage by passage through a mat or cake of larger particles of solids carried by raw sewage or sludge.

An element of this invention comprises a novel and highly effective filtering device adapted not only for the effective filtering of sewage, but, at the same time, adapted particularly for continuous discharge of glutinous matter and solid matter in the form of a mat or cake and in a substantially dry condition such as to enable it to be disposed of readily by burning.

Having indicated in a general way the nature and purpose of this invention, I will proceed to a detailed description thereof with reference to the accompanying drawings, in which I have illustrated a preferred embodiment thereof in connection with apparatus for the disposal of sewage and in which:

Figure 1 is a plan view of an apparatus for the treatment of sewage embodying this invention.

Figure 2 is a longitudinal, sectional view of the subject of Figure 1.

Figure 10 is a sectional view showing means for controlling the operation of the filter shown in Figure 5.

Figure 3:
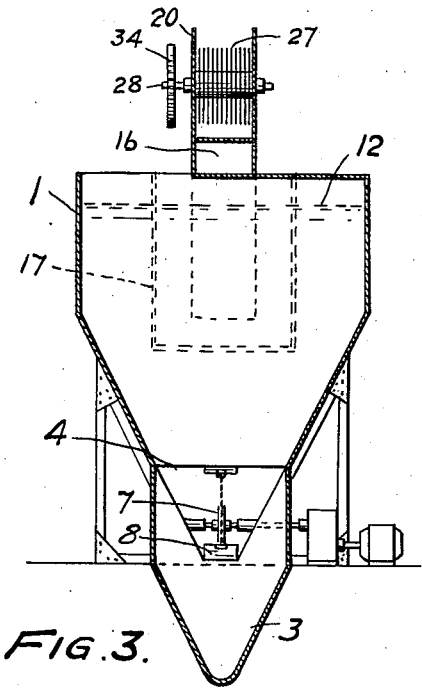
Figure 3 is a cross-sectional view on line 3—3, Figure 2.
Figure 4:
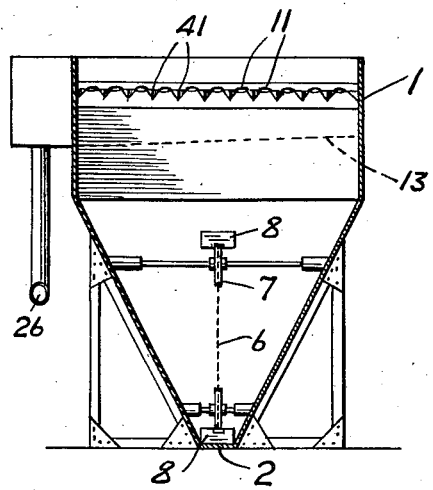
Figure 4 is a cross-sectional view on line 4—4, Figure 2.

Referring now to the several figures, I indicates a settling tank of substantial length, the lower part of the sides of which converge to form a narrow trough-like bottom 2. The tank I is provided with a cover or deck 42. At the end of the tank I is a sump 3 connected with the bottom of tank I through an opening 4, while a discharge conduit 5 is provided at the opposite end. Within the tank is an endless chain 6, carrying scraper bars 8 and running over sprockets 7, one of which is driven.

Figure 7:
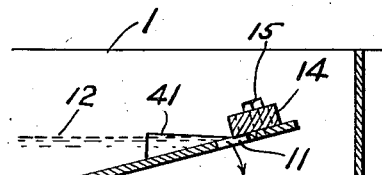
Figure 7 is a sectional view of a detail of the apparatus shown in Figure 1.

Adjacent the discharge conduit 5 is a weir 9, adjacent to which is a skimmer, shown in detail in Figure 7 and comprising a plate 10 extending from side to side of the tank I, at a small angle to the plane of the normal liquid level 12 in the tank, and provided with a series of holes 11 through which scum or floating matter will fall into a chamber 13. The effective area of the holes 11 may be varied by adjustment of a slotted bar 14 secured to the plate 10 by means of bolts 15 passing through the slots.

The tank I is provided with an inlet passage 16, which leads into a vertically partitioned chamber 17, provided with baffles 18 to provide a circuitous passage, and having a discharge opening, opening upwardly, into tank I below the normal level 12 of liquid therein. A baffle plate 19, which may be horizontal as shown or tipped at an angle is positioned above the outlet from chamber 17 to baffle the discharge therefrom.

A filtering chamber 20, provided with a manhole, in which is positioned a filter, receives raw sewage from a conduit 21, ahead of the discharge end of which is positioned a baffle 22. A valved conduit 23 leads into the filtering chamber for the addition of oil or other material to the sewage to be filtered, while a pump 24 and piping 25 provide for the introduction of material from the sump 3 to the filtering chamber. A conduit 26 also leads from chamber 13, beneath the skimmer, to the piping 25 on the inlet side of the pump for the introduction of skimmings into the filtering chamber and to enable priming of the pump when necessary.

Figure 6:
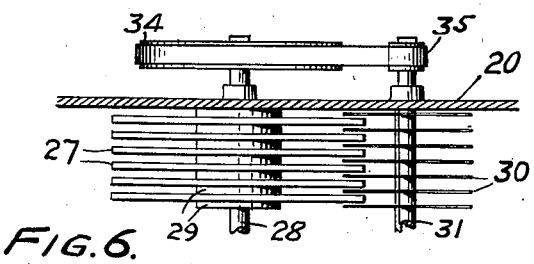
Figure 6 is a plan view, partly broken away, of the filter shown in Figure 5.
Figure 5:
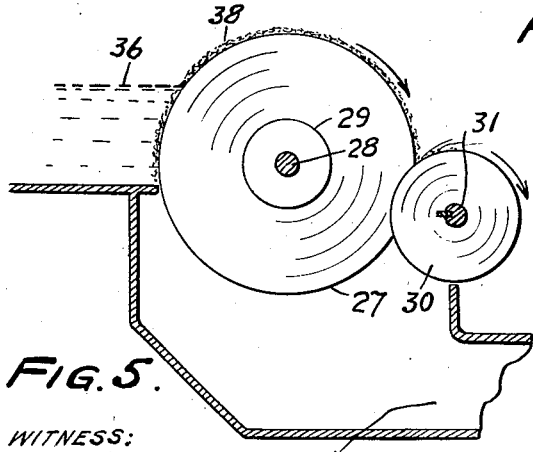
Figure 5 is a sectional view of the filter included in the apparatus shown in Figure 1.

The filter proper is arranged in the filtering chamber at the mouth of the inlet conduit 16 and comprises, as shown in Figures 5 and 6, a series of discs 27 mounted on a shaft 28 and arranged in closely spaced relation by means of spacers 29. Extending between the discs 27 are discs 30 keyed on a shaft 31. The shaft 31 is adapted to be driven by means of a motor 32 working through a reduction gear 33 and the two shafts are connected by means of a belt and a large pulley 34 on shaft 28 and a small pulley 35 on shaft 31.

The discs will be positioned and the rate of introduction of sewage into the filtering chamber will be such that the discs 27 will extend above the level 36 of the liquid and below the buttom of the filtering chamber.

The diameter and gauge of the large and small discs, the spacing of the large discs and the speed of rotation will be dictated by the character, percentage of solids in the sewage to be filtered and its rate of flow. By way of example, the discs 27 may be of any suitable metal or alloy, of say 16 gauge, and have a diameter of twelve inches and a spacing of $\frac{1}{16}$ inch; and the discs 30 may be made of similar gauge material with a diameter of four inches. As shown, the discs 30 will extend between the discs 27.

Figures 8, 9:
Figures 8 and 9 are fragmentary views, partly in section, showing modification of the structures of the filter shown in Figures 5 and 6.

The structure of the filter as shown and as described above is subject to various modifications as, for example, is shown by Figures 8 and 9. Thus, in substitution for the discs 30 a suitably mounted scraper bar 39 is positioned to extend transversely of the series of discs 27 for the removal therefrom of the cake or mat 38, as shown in Figure 9. And again for the discs 30 a series of suitably mounted figures 40, extending between the discs 27, may be substituted, as shown in Figure 9.

Adjacent the inlet end of tank 1 a ventilator 43, adjustable to the wind, is let into the deck 42 and the deck 42 ends on a line short of the holes 11 in plate 10 at the outlet end of the tank.

Referring now to Figure 10, on the shaft 28, carrying the discs 27 of the filter shown in Figures 5 and 6, is mounted a friction disc 48 adapted to be driven by a friction wheel 45 carried on a shaft 46, which is in turn driven by any suitable motor through a reduction gearing 33. The friction wheel 45 is slidably mounted on shaft 46 and is adapted to be slid to vary the speed of the shaft 28 and discs 27, dependent on the level 36 of the sewage in the filtering chamber 20, by means of a float carried on an arm 47 secured to a shaft 49, carrying a rocker arm 50, forked for engagement with the friction wheel 45.

In operation, for example, raw sewage, or so-called sludge, or both together, having desirably been filtered through a bar screen for the removal of solid matter of relatively large size, will be introduced into the filtering chamber 20 through conduit 21, while the discs 27 and 30 are slowly revolved. The liquid component of the sewage will pass between discs 27 to the inlet conduit 16, while the solid components of larger sizes will be caught by the discs with the building up or formation of a mat 38 on the periphery of the discs. The mat formed initially of the layer of the solid components will act to intercept or catch the smaller solid components. As the discs 27 revolve, in the direction of the arrow, Figure 5, the mat will be carried above the liquid level 36 and slowly around toward the small discs 30. As the mat travels from above the liquid level to the small discs 30, it will be drained of water to a state of relative dryness by the capillary action of the faces of the discs 27. The mat will be removed from the discs 27 by the discs 30 which are driven in the direction of the arrow, Figure 6, at a higher peripheral speed than that of discs 27 and will fall into chamber 37, from which it may be removed by raking, or otherwise, through a suitable manhole. Desirably, petroleum oil will be added to the raw sewage or sludge through the conduit 23 and will pass through the discs 27 with the liquid component of the sewage.

As will be appreciated, the formation of the mat on discs 27 will depend upon the speed of rotation of the discs 27 and the character of the sewage at a given rate of flow from the standpoint of solids content. Hence, with a given speed of rotation of discs 27 and a sewage of given solids content an efficient mat will form. If, now, the solids content increases without change in speed of the discs, the mat will form more rapidly to an excessive thickness and the passage of liquid will be retarded with rise in the level 36 of the sewage in the chamber 20. Rise in the level 36 will cause the float on arm 47 to rise, effect a turning of rocker arm 46 and a shifting of friction wheel 45 toward the center of the friction disc with consequent increase in speed of rotation of the discs 27 to such as will properly proportion their speed of rotation to the solids content of the sewage. Similarly, when the solids content decreases, the mat will form more slowly to an insufficient thickness and the level 36 will fall. In such case the speed of the discs 27 will be decreased by movement of the friction wheel 45 toward the periphery of the friction disc 48 as a result of the falling of the float. It will be appreciated that other means may be used for control of the formation of the mat. Thus, more or less of the filtering area of the discs may be presented to the stream, depending upon change in the character or quantity of solids in the liquid.

The liquid component of the sewage, together with oil, if such be added, after passing through the discs 27 will pass into settling tank 1, through the partitioned chamber 17, in which the oil and liquid will be thoroughly mixed by virtue of the tortuous pass afforded by the baffles 18. The liquid will pass slowly through the tank 1 to permit settlement of finely divided solid matter not removed by the filter and flotation or levitation of the oil and colloided solid matter. Solid matter settling in the tank 1 will be removed to sump 3 by means of the scraper bars on chain 6, which will be driven in the direction of the arrow. Floated matter will be removed from the surface of the liquid in tank 1 by passing into chamber 13 through the holes 11 in plate 10, toward which it will be driven by air directed through the tank beneath the deck 42.

In the treatment of the sewage matter, the sludge or admixed solid matter and liquid in sump 3 will be pumped back into the filtering chamber and refiltered in order that the finely divided solid components thereof to as great an extent as possible may be removed by filtration through the cake or mat on discs 27. Likewise, the floated matter collected in chamber 13 will be returned to the filtering chamber and refiltered.

The procedure and apparatus, and especially the filtering element, described above more especially with reference to the treatment of sewage and so-called sewage sludge is, as will be appreciated, adaptable for the treatment of various liquids carrying solid matter and more especially including solid matter of a flocculent, fibrous or glutinous character such as will promote the building up of a mat or cake on the filtering element. Hence, it will be understood that it is not intended that this invention shall be limited by the description thereof with reference to the treatment of sewage, such being, however, a specific and highly advantageous aspect thereof.

It will be understood that the term "sewage" as used in various of the claims appended hereto is intended to include liquid burdened with solids, as various municipal and industrial outfall waters or other liquids in a raw state or partially concentrated by sedimentation, filtration or otherwise, and also to include various municipal and industrial intake waters.

What I claim and desire to protect by Letters Patent is:

1. A method for the treatment of sewage comprising liquid and solid components, which includes passing a stream of the sewage through a series of spaced discs while rotating the spaced discs as a unit through the stream of sewage at a rate with respect to the solids content of the sewage such that solids in the sewage will form a mat on the periphery of said unit in the path of the sewage passing therethrough and continuously removing the mat from the periphery of said unit at a point outside the stream of sewage.

2. A method for the treatment of sewage comprising liquid and solid components, which includes passing a stream of the sewage through a series of circular, spaced elements while rotating the spaced elements as a unit through the stream of sewage at a rate with respect to the solids content of the sewage such that solids in the sewage will form a mat on the periphery of said unit in the path of the sewage passing therethrough and continuously removing the mat from the periphery of said unit at a point outside the stream of sewage.

3. A method for the treatment of sewage comprising liquid and solid components, which includes adding oil to the sewage, passing the sewage through a filter, effecting sedimentation and levitation of solid matter and oil in the filtered sewage, separating sedimentated and levitated solid matter together with liquid from the sewage and returning sedimented and levitated matter and liquid for passage through said filter.

4. A method for the treatment of sewage comprising liquid and solid components, which includes passing the sewage through a series of spaced rotating discs at a rate with respect to the speed of rotating of the discs such that a mat of solid matter from the sewage will form peripherally of the series of discs in the path of the sewage, effecting sedimentation of solid matter in the filtered sewage, separating sedimented solid matter together with liquid from the sewage and returning sedimented matter and liquid for passage through said series of discs.

5. A method for the treatment of sewage comprising liquid and solid components, which includes adding oil to the sewage, passing the sewage through the series of spaced rotating discs at a rate with respect to the speed of rotation of the discs such that a mat of solid matter from the sewage will form peripherally of the series of discs in the path of the sewage, effecting sedimentation and levitation of solid matter and oil in the filtered sewage, separating sedimented and levitated solid matter together with liquid from the sewage and returning sedimented and levitated matter and liquid for passage through said series of discs.

6. Apparatus for the treatment of sewage including, in combination, a filter comprising a series of closely spaced solid discs, a second series of discs extending respectively between the discs of said first mentioned series and adapted to remove solid matter from the periphery of said series of discs, means for rotating said series of discs, and means for directing a stream of sewage for passage through the filter.

7. A filter including, in combination, a series of spaced solid discs, means for directing a stream of liquid carrying solids through said discs, a second series of discs of a diameter less than that of said first series and extending respectively between the discs of said first series for the removal of solids collected on the periphery thereof and to discharge said solids apart from the stream of liquid and means for rotating said series of discs as units at different speeds.

8. A filter including, in combination, a series of spaced discs, means for directing a stream of liquid carrying solids through such discs, means associated with said series of discs and adapted to remove solids collected on the periphery thereof and to discharge said solids apart from the stream of liquid, means for rotating said series of discs as a unit, and means controlled by the rate of passage of said stream of liquid through said discs for varying the speed of rotation of said series of discs.

CHARLES GILBERT HAWLEY.